United States Patent
Kato et al.

(10) Patent No.: US 7,734,062 B2
(45) Date of Patent: Jun. 8, 2010

(54) ACTION RECOGNITION APPARATUS AND APPARATUS FOR RECOGNIZING ATTITUDE OF OBJECT

(75) Inventors: Noriji Kato, Kanagawa (JP); Hitoshi Ikeda, Kanagawa (JP); Masahiro Maeda, Kanagawa (JP)

(73) Assignee: Fuji Xerox Co., Ltd., Tokyo (JP)

( * ) Notice: Subject to any disclaimer, the term of this patent is extended or adjusted under 35 U.S.C. 154(b) by 1329 days.

(21) Appl. No.: 10/927,075

(22) Filed: Aug. 27, 2004

(65) Prior Publication Data
US 2005/0084141 A1    Apr. 21, 2005

(30) Foreign Application Priority Data
Aug. 29, 2003  (JP)  ............ P2003-306206

(51) Int. Cl.
G06K 9/00 (2006.01)
(52) U.S. Cl. .............. 382/103; 382/164; 382/118; 715/863
(58) Field of Classification Search ........ 382/103, 382/100, 118, 164, 165; 715/863, 865; 348/143–160
See application file for complete search history.

(56) References Cited

U.S. PATENT DOCUMENTS

| | | | | |
|---|---|---|---|---|
| 6,118,888 | A * | 9/2000 | Chino et al. | 382/118 |
| 6,707,933 | B1 * | 3/2004 | Mariani et al. | 382/118 |
| 6,792,135 | B1 * | 9/2004 | Toyama | 382/118 |
| 6,804,396 | B2 * | 10/2004 | Higaki et al. | 382/181 |
| 7,027,621 | B1 * | 4/2006 | Prokoski | 382/118 |
| 7,239,726 | B2 * | 7/2007 | Li | 382/118 |

(Continued)

FOREIGN PATENT DOCUMENTS

JP    A 06-213632    8/1994

(Continued)

OTHER PUBLICATIONS

Recognition of head gestures using hidden Markov models Morimoto, C.; Yacoob, Y.; Davis, L.; Pattern Recognition, 1996., Proceedings of the 13th International Conference on vol. 3, Aug. 25-29, 1996 pp. 461-465.*

(Continued)

Primary Examiner—Bhavesh M Mehta
Assistant Examiner—Sean Motsinger
(74) Attorney, Agent, or Firm—Oliff & Berridge, PLC

(57) ABSTRACT

An action recognition apparatus acquires image data and outputs action information representing an action content of a human captured in the image data. The action recognition apparatus includes a face-portion specifying section, an acquisition section, a specifying section, and an information output section. The face-portion specifying section specifies a first image region including a face portion of the human from the image data. The acquisition section acquires skin-color information peculiar to the human from pixel values of the first image region. The specifying section specifies at least one second image region including a predetermined portion of a body of the human from the image data except for the first image region based on the skin-color information. The information output section outputs the action information representing the action content of the human based on position relation between the specified first image region and the specified second image region.

3 Claims, 3 Drawing Sheets

U.S. PATENT DOCUMENTS

| | | | |
|---|---|---|---|
| 7,274,800 B2* | 9/2007 | Nefian et al. | 382/103 |
| 7,321,854 B2* | 1/2008 | Sharma et al. | 704/243 |
| 7,340,100 B2* | 3/2008 | Higaki et al. | 382/199 |
| 7,369,687 B2* | 5/2008 | Kawato et al. | 382/118 |
| 2002/0122593 A1 | 9/2002 | Kato et al. | |
| 2003/0113018 A1* | 6/2003 | Nefian et al. | 382/181 |
| 2004/0028260 A1* | 2/2004 | Higaki et al. | 382/118 |
| 2004/0056907 A1* | 3/2004 | Sharma et al. | 345/863 |
| 2004/0190753 A1* | 9/2004 | Sakagami et al. | 382/103 |
| 2004/0190776 A1* | 9/2004 | Higaki et al. | 382/190 |
| 2005/0084141 A1* | 4/2005 | Kato et al. | 382/118 |

FOREIGN PATENT DOCUMENTS

| | | |
|---|---|---|
| JP | A 07-282235 | 10/1995 |
| JP | 8-320920 | 12/1996 |
| JP | A 2001-129777 | 5/2001 |
| JP | A 2003-006645 | 1/2003 |
| JP | A 2003-108980 | 4/2003 |

OTHER PUBLICATIONS

Wu, Jianxin, Zhou, Zhi-Hua "Efficient face candidates selector for face detection" National Laboratory for Novel Software Technnology Nanjing University, Nanjing.*

English language translation of Japanese Office Action mailed Nov. 17, 2009.

* cited by examiner

ACTION RECOGNITION APPARATUS AND APPARATUS FOR RECOGNIZING ATTITUDE OF OBJECT

BACKGROUND OF THE INVENTION

1. Field of the Invention

The present invention relates to an action recognition apparatus for outputting information concerning action and attitude of an object such as human being and an attitude recognition apparatus.

2. Description of the Related Art

Conventionally, one using relative position relation of hands or shoulders has been developed as an apparatus for recognizing attitude of human being, which is an object to be captured, from capturing image data (see JP-A-Hei. 8-320920). Here, it is difficult to recognize an object, such as hands, that has large freedom degrees of deformation by the pattern recognition. Therefore, such object has been recognized using its color.

SUMMARY OF THE INVENTION

However, in a case of recognizing an object (e.g. a hand) with using its color, if skin-colored something is present in the neighbor of the hand, misrecognition often occurs. Also, even if the object is not a human being but a general object such as an animal or a robot, the recognition reaches the same result. In a case of recognizing a part of an object with using attribute of appearance, if another object that has similar attribute is captured, misrecognition often occurs.

The invention has been made in view of the above circumstances and provides an action recognition apparatus that can improve detection accuracy when it recognizes an object using an attribute of the object, and an apparatus for recognizing attitude of an object.

In order to solve the above described problem in the related art, one embodiment of the invention provides an action recognition apparatus that acquires image data generated by capturing an image including a face of a human and outputs action information representing an action content of the human captured in the image data. The action recognition apparatus includes a face-portion specifying section, an acquisition section, a specifying section, and an information output section. The face-portion specifying section specifies a first image region including a face portion of the human from the image data. The acquisition section acquires skin-color information peculiar to the human from pixel values of the first image region. The specifying section specifies at least one second image region including a predetermined portion of a body of the human from the image data except for the first image region based on the skin-color information. The information output section outputs the action information representing the action content of the human based on position relation between the specified first image region and the specified second image region.

According to one embodiment of the invention, an apparatus for recognizing attitude of an object, includes a reception section, a first-portion specifying section, an acquisition section, a specifying section, and an information output section. The reception section acquires image data generated by capturing at least a part of the object. The first-portion specifying section specifies a first image region including a predetermined characteristic portion from the image data. The acquisition section acquires attribute information concerning appearance of the object from pixel values of the first image region. The specifying section specifies at least one second image region including an image portion showing a part of the object from the image data except for the first image region based on the attribute information. The information output section outputs information concerning attitude of the object based on position relation between the specified first image region and the specified second image region.

According to one embodiment of the invention, an action recognition method uses a computer for acquiring image data generated by capturing an image including a face of a human and outputting action information representing an action content of the human captured in the image data. The action recognition method includes specifying a first image region including a face portion of the human from the image data; acquiring skin-color information peculiar to the human from pixel values of the first image region; specifying at least one second image region including a predetermined portion of a body of the human from the image data except for the first image region based on the skin-color information; and outputting the action information representing the action content of the human based on position relation between the specified first image region and the specified second image region.

According to one embodiment of the invention, an action recognition program causes a computer to acquire image data generated by capturing an image including a face of a human and output action information representing an action content of the human captured in the image data. The action recognition program causing the computer to execute a process including: specifying a first image region including a face portion of the human from the image data; acquiring skin-color information peculiar to the human from pixel values of the first image region; specifying at least one second image region including a predetermined portion of a body of the human from the image data except for the first image region based on the skin-color information; and outputting the action information representing the action content of the human based on position relation between the specified first image region and the specified second image region.

BRIEF DESCRIPTION OF THE DRAWINGS

Preferred embodiments of the present invention will be described in detailed based on the following figures, wherein.

DETAILED DESCRIPTION OF THE PREFERRED EMBODIMENT

Figure 1:
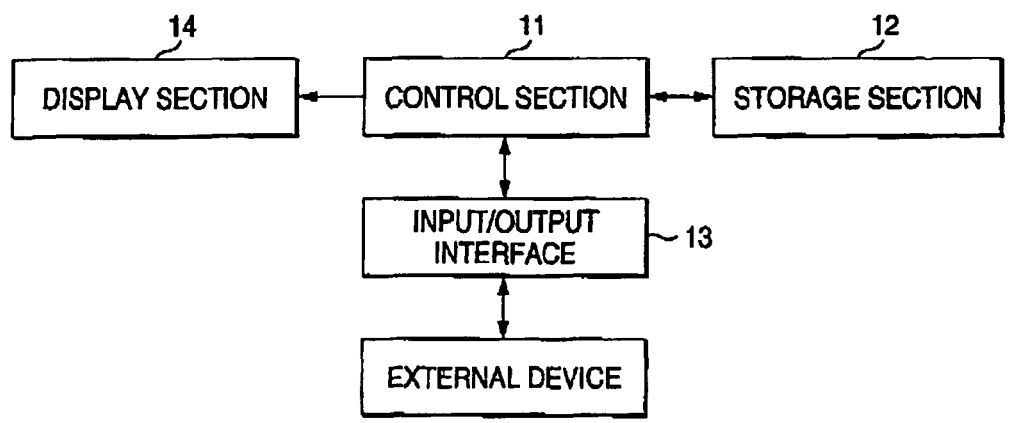
FIG. 1 is a block diagram showing a configuration of an action recognition apparatus according to one embodiment of the invention.

With reference to the drawings, an embodiment of the invention will be described. An action recognition apparatus according to the embodiment of the invention includes a control section 11, a storage section 12, an input/output interface 13, and a display section 14 as shown in FIG. 1.

The control section 11 operates in accordance with a program stored in the storage section 12. The control section 11 basically executes a process (face specifying process) for specifying an image of face portion from image data obtained from an external; a process (hand specifying process) for specifying an image of a hand portion from the image data obtained; and an action recognition process for recognizing an action of a human being who is an object to be captured on the basis of information of relative positions of the face and hands, which are specified by the face specifying process and the hand specifying process. These processes will be described in detailed later.

The storage section 12 is a computer readable storage medium that stores the program executed by the control section 11. Also, the storage section 12 operates as a work memory that stores various data required during the processes of the control section 11. The input/output interface 13 is connected to an external device such as a camera as shown in FIG. 1 and obtains image data from the external device to output it to the control section 11. Also, the input/output interface 13 outputs various data to the external device in accordance with instructions input from the control section 11. The display section 14 is, for example, a display and displays information in accordance with instructions input from the control section 11.

Figure 2:
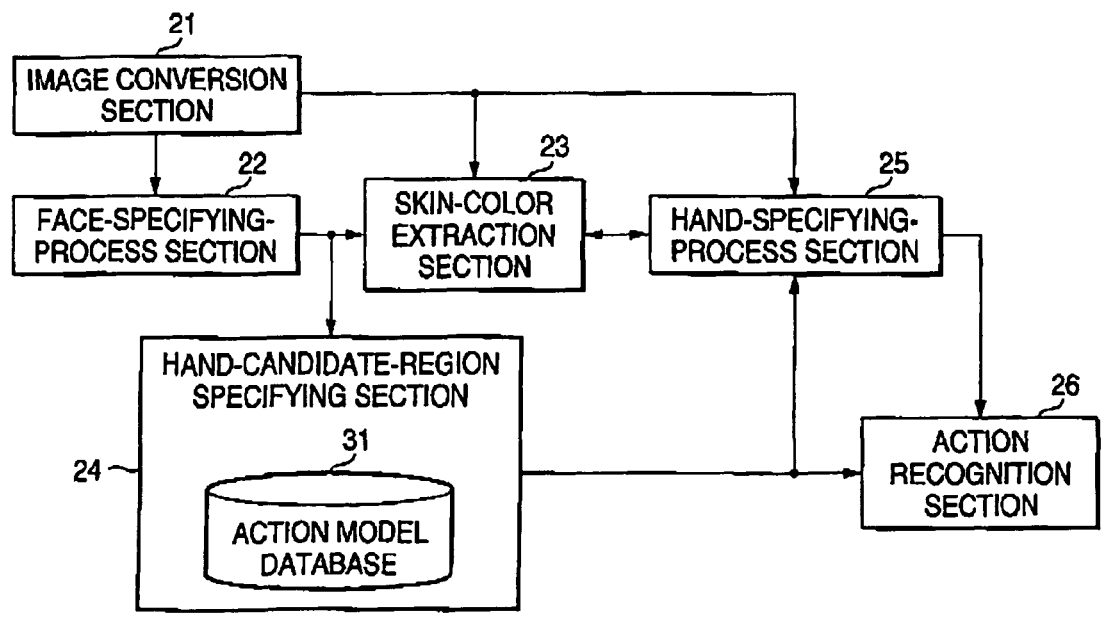
FIG. 2 is a functional block diagram showing an example of process of the action recognition apparatus according to one embodiment of the invention.

As shown in FIG. 2, the program executed by the control section 11 functionally includes an image conversion section 21, a face-specifying-process section 22, a skin-color extraction section 23, a hand-candidate-region specifying section 24, a hand-specifying-process section 25, and an action recognition section 26. The image conversion section 21 converts the image data, which is obtained through the input/output interface 13 and is to be processed, into gray-scale image data (gray-scale data) and outputs the gray-scale image data to the face-specifying-process section 22. Also, the image conversion section 21 converts the image data to be processed into image data (hue data) of a hue image and outputs the image data of the hue image to the skin-color extraction section 23 and the hand-specifying-process section 25.

The face-specifying-process section 22 executes a process for specifying a face portion from the gray-scale data input from the image conversion section 21. As will be described later, the face-specifying-process section 22 may recognize the face portion in the image data on the basis of data acquired by learning in advance. Also, the face-specifying-process section 22 can specify not only a position of a face but also a direction of the face (three-dimensional direction) or a size of the face (such face specifying process also will be described later).

Of the hue data input from the image conversion section 21, the skin-color extraction section 23 extracts a partial image of a region corresponding to the face portion specified by the face-specifying-process section 22, calculates distribution of hue data of the partial image, and output the calculated average hue data. Specifically, the skin-color extraction section 23 outputs as skin-color information a histogram of pixel values in the hue data contained in the region that is defined by region information output from the face-specifying-process section 22. The skin-color information is a histogram of colors of the face (that is, colors of face's skin) specified by the face-specifying-process section 22 and is, in a manner, peculiar to each person. The action recognition apparatus according to the embodiment extracts skin color peculiar to an object and specify a hand portion of the object using the specified skin color. Incidentally, in order to take into consideration a case where brightness of skin colors of a face and hands vary due to sunburn or illumination conditions, the comparison is made using hue.

The hand-candidate-region specifying section 24 outputs at least one candidate-region, which is estimated to include a hand of human being, on the basis of position information of the face portion input from the face-specifying-process section 22. Specifically, the hand-candidate-region specifying section 24 includes an action model database 31. While referring to action model data stored in the action model database 31, the hand-candidate-region specifying section 24 outputs information for defining the region, which is estimated to include the hand (for example, coordinates of vertexes on a diagonal of a rectangle, when the region is defined by the rectangle), as the hand candidate region.

Here, the action model database 31 can be generated using a model image, which is obtained by projecting a three-dimensional model of human body onto a virtual two-dimensional plane. For example, as shown in a lower drawing of FIG. 3A, when a person reaches up his/her arm for an object to be operated (for example, a personal computer, which is indicated by a dashed line PC in FIG. 3A), at least one entry is generated in which a position (P1) of the head portion at this time, hand candidate regions (P2L, P2R) corresponding to the left hand and the right hand, and information representing an action content "an operation of a personal computer or the like" are associated with each other. The generated entry is stored in the action model database 31.

Figure 3B:
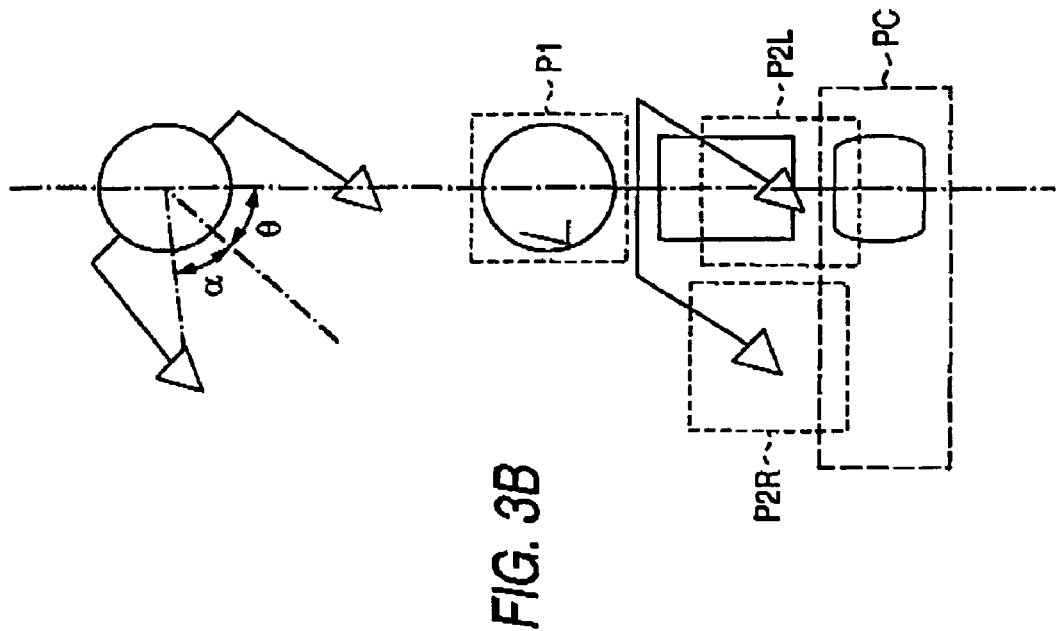
FIG. 3 is an explanatory view showing an example of information set with respect to an action model.
Figure 3A:
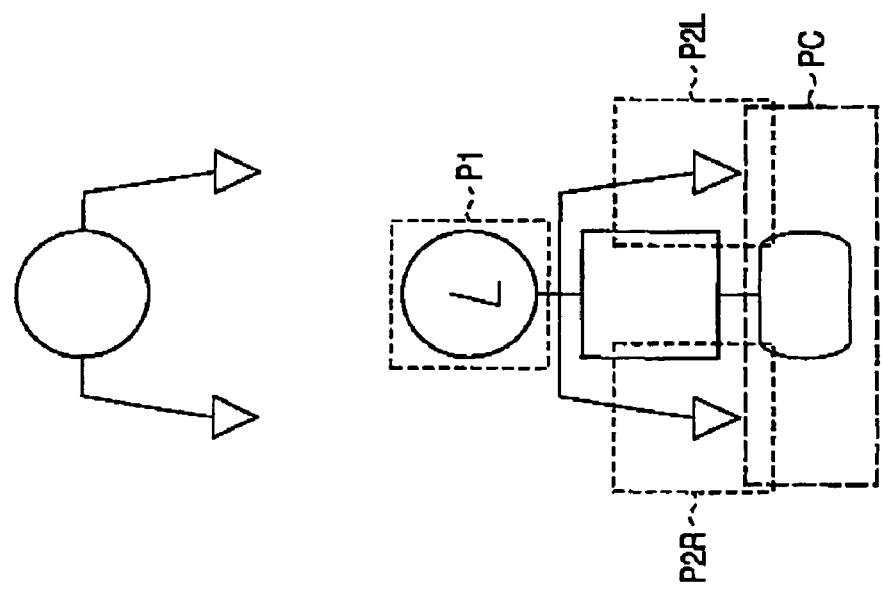

As shown in FIG. 3B, when the person turns in his/her right direction by an angle θ around the head from the attitude shown in FIG. 3A (see upper drawings of FIGS. 3A and 3B), relative positions of the hand candidate regions (P2L. P2R) with respect to the position (P1) of the head portion change as shown in a lower drawing of FIG. 3B. The position after the change can be calculated as a position moved from the basic position shown in FIG. 3A by L×sin (α+θ), where L represents a distance between a center of the head portion and a predetermined portion in the hand portion and α represents an angle between the center of the head portion and the predetermined portion in the hand portion (it is noted that the left hand and the right hand may have the same absolute values of the distance L and the angle α, or alternatively, may have different absolute values).

Incidentally, it has been assumed that the positions of the hands move in response to the turning angle of the head portion. In a case where the angle θ can be obtained from the face-specifying-process section 22, it is necessary to determine the distance L. As a parameter estimated from degree of extension of a cubital joint in a relation with the attitude, the distance L may be associated with information representing positions of the head portion and hands or the action content and then be included in each entry.

The hand-candidate-region specifying section 24 takes one entry from the action model database 31. Then, the hand-candidate-region specifying section 24 generates a corrected hand candidate region with respect to the position of the head portion using information of a face direction (the angle θ) output from the face-specifying-process section 24; the distance L included in the taken entry; a predetermined α; and information of the base position included in the taken entry. The hand-candidate-region specifying section 24 outputs the generated corrected hand candidate region together with the information representing the action content included in the taken entry.

In other words, the hand-candidate-region specifying section 24 outputs the position corresponding to the head portion in the model image, position information representing the corrected hand candidate region, and information representing the action content associated therewith, using the model image obtained by projecting the three-dimensional model of the human body onto the virtual two-dimensional plane.

The hand-specifying-process section 25 determines one region (search start region) for each of the positions P2L, P2R of the hands on the basis of the position information of the face output from the face-specifying-process section 22 and the position information output from the hand-candidate-region specifying section 24. Searching for a hand on the hue data input from the image conversion section 21 is started from the search start region. For example, with regard to the position P2L of the hand, the search start region may be defined as a rectangle including a portion overlapping the rectangle defining P2L. Then, the hand-specifying-process section 25 obtains the center of gravity of skin-color portions output from the skin-color extraction section 23 from a part of the hue data, which is included in the search start region, using pixel values of the pixels in the search start region and a value indicated by the skin-color information output from the skin-color extraction section 23. The hand-specifying-process section 25 defines a new search region with setting the obtained center of gravity as a center. The new search region may have the same size and the same shape as the search start region.

Subsequently, the hand-specifying-process section 25 repeats the process for obtaining the center of gravity of the skin-color portions and the process for moving the search region, in the new defined search region in the similar manner until a distance between a new obtained center of gravity and a previous center of gravity is equal to or lower than a predetermined value (until the search region converges). It is noted that if the search region does not converge within a predetermined number of repeating times, it may judged that a hand has not been detected and the process may be terminated.

When the search region converges, the hand-specifying-process section 25 checks whether or not a position of the convergent center of gravity is within the corrected hand candidate region. If within the corrected hand candidate region, the hand-specifying-process section 25 judges that a hand is detected. If not within the corrected hand candidate region, the hand-specifying-process section 25 judges that a hand is not detected.

As described above, when it is judged that a hand is not detected such as a case where the convergence does not occur within the predetermined number of repeating times or a case where a position of the center of gravity resulting from the convergence is not within the corrected hand candidate region, the hand-specifying-process section 25 requests the hand-candidate-region specifying section 24 to provide a new search start coordinate. Then, the hand-candidate-region specifying section 24 takes from the next entry in the action model database 31 a position corresponding to the head portion, the position information representing a position corresponding to a hand, and the action content associated therewith and outputs them.

Also, when it is judged that a hand is detected, the hand-specifying-processing section 25 notifies the action recognition section 26 of such judgment. Incidentally, when the corrected hand candidate region output from the hand-candidate-region specifying section 24 is two ones corresponding to the left hand and the right hand, the hand-specifying-processing section 25 executes a process for detecting a hand from each corrected hand candidate region; and when it is judged that hands are detected in the all corrected hand candidate regions, the hand-specifying-processing section 25 may output information representing that the hands are detected to the action recognition section 26. Also, when it is judged that a hand is not detected in either one of the corrected hand candidate regions, the hand-specifying-processing section 25 may judge that a hand is not detected and request the hand-candidate-region specifying section 24 to provide a new search start coordinate.

The action recognition section 26 holds the information representing the action content output previously (that is, last time) from the hand-candidate-region specifying section 24. When the information representing that a hand is detected is input from the hand-specifying-process section 25 into the action recognition section 26, the action recognition section 26 outputs the holding information representing the action content.

[A Process for Specifying a Face]

Here, a process for specifying a face will be described. For example, the face-specifying-process section 22 may be one that extracts a portion corresponding to a face of a human being from image data using first learning data, which learns a face of human being. At this time, firstly, after a face portion is specified by a predetermined method, an image of the upright- and full-face (a normal image) and a plurality of face images in which a face is turned in a right direction and a left direction by a predetermined angle are prepared in advance. Then, an image of the face portion may be converted (normalized) so as to bring the image of the face portion to be close to the normal image using second learning database that learns the prepared images, and then it may be judged whether or not the image data after the normalization is a face image. According to this procedure, since a turning angle can be judged during the process of the normalization, it can be judged rapidly by the process of the normalization whether or not a processed image includes a face. Also, the turning angle obtained during the process of the normalization is output, so that a process that uses a direction of a face can use the turning angle.

A known pattern recognition method may be used as a method for specifying a face portion. The know pattern recognition method includes, for example, a subspace method and a nonlinear subspace method. A pattern recognition method may calculate a subspace into which face images are classified with using the face images in advance, and can specify one that is classified into the subspace to which the face images belong as a face image when a partial image of an input image is converted. Such a pattern recognition method is described in detail in U.S. 2002/0122593 A1 ("pattern recognition method and apparatus"), which is incorporated herein by reference in its entirety. Incidentally, with regard to a judgment method after the normalization, the judgment can be made by checking whether or not an image is classified into the face images with using the pattern recognition method or the like in a similar manner after the above-described normalization.

[Operation]

Figure 4:
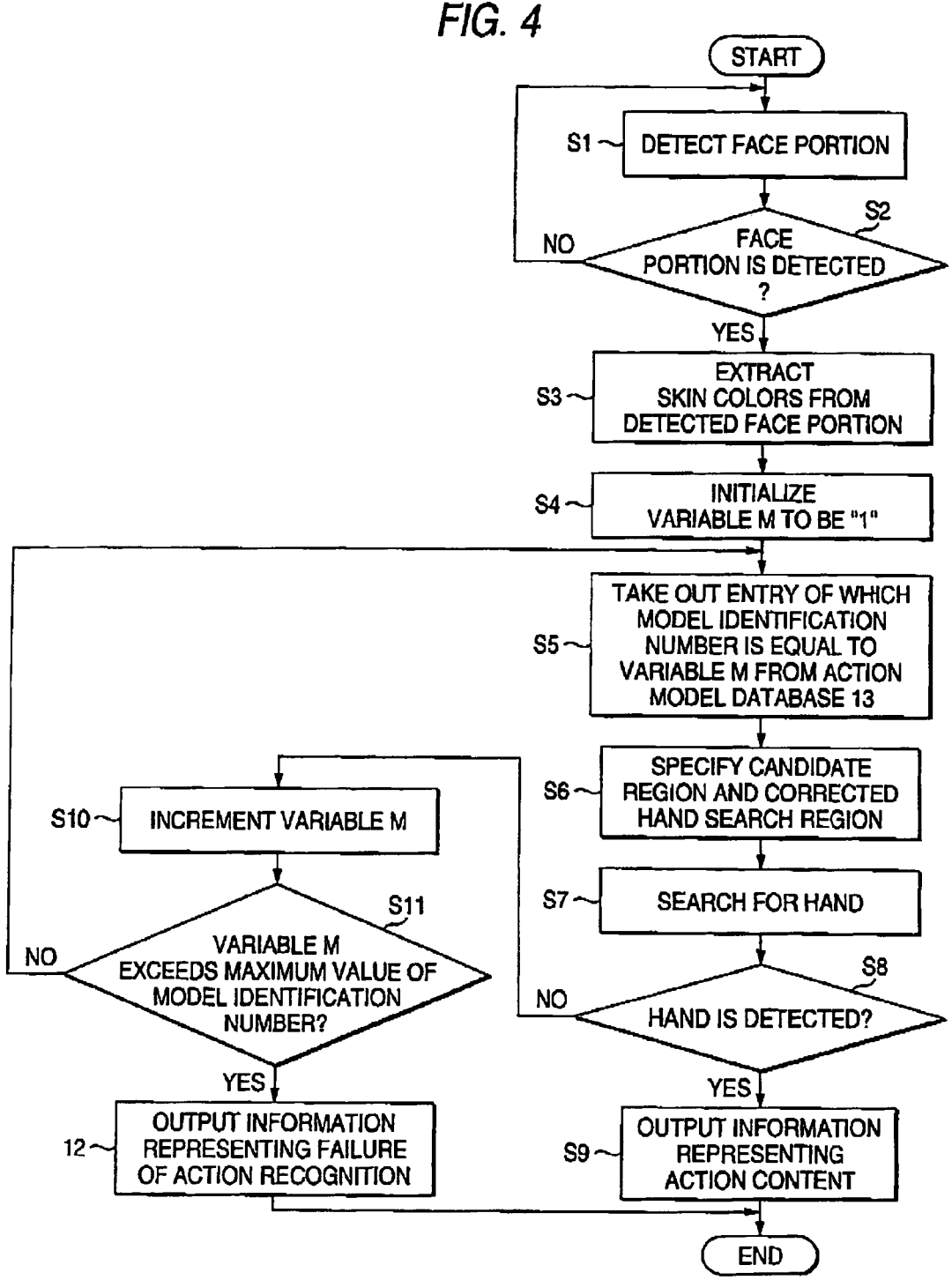
FIG. 4 is a flow chart showing operation of the action recognition apparatus according to one embodiment of the invention.

The action recognition apparatus according to the embodiment of the invention operates as follows. Incidentally, It is assumed that in the following description, model identification numbers, which are sequence numbers, are allotted to the entries in the action model database 13, respectively. As shown in FIG. 4, the action recognition apparatus first executes a process for detecting a face portion of an input image (S1), and judges whether or not a face can be detected (S2). If the face is not detected at this point, the action recognition apparatus returns to and repeats the process S1. Also, if the face is detected (if Yes), the action detection apparatus extracts a skin color peculiar to the person from the detected face portion (S3).

This process can be realized, for example, by extracting a histogram of hue components of the face portion. Then, the action recognition apparatus initializes a variable M to be "1"

(S4) and takes out an entry of which the model identification number is equal to the variable from the action model database 13 (S5).

Then, the action recognition apparatus specifies a candidate region in which a position of a hand is search for and a search start region (a corrected hand search start region) from information included in the taken entry (S6), and searches for a hand in the candidate region. As described above, the process for searching for a hand repeats a process for obtaining in the search region a center of gravity of skin colors extracted in the process S3 and a process for moving a center of the search region to the obtained center of gravity until the movement of the search region converges or repeating exceeds a predetermined number of repeating times.

Then, the action recognition apparatus checks whether or not a hand is detected by the process S7 (S8). If the hand is detected (if Yes), the action recognition apparatus outputs information representing the action content included in the entry taken in the process S5 and terminates processes. Here, the action recognition apparatus can judge whether or not a hand is detected using a condition that the movement of the search region converges and a position of the center of gravity resulting from the convergence is within the candidate region defined in the process S6.

Also, if a hand is not detect in the process S8 (if No), the action recognition apparatus increments the variable M (S10) and checks whether or not the variable M exceeds the maximum value of the model identification number (that is, the processes from S6 to S8 are executed with respect to all models) (S11). If the variable M exceeds the maximum value (if Yes), the action recognition apparatus outputs information representing failure of the action recognition (S12) and terminates processes.

On the other hand, if the variable M does not exceed the maximum value of the model identification number in the process S11, the action recognition apparatus returns to the process S5 and continues processes.

MODIFIED EXAMPLE

In the aforementioned description, the action model database 13 is described to store the information representing the action content associated with a position of human body such as a head and a hand. However, the action model database 13 is not limited thereto, but may use a position of another exposed portion of human body (for example, a foot if a person is in a circumstance to be with bare foot) Furthermore, the action model database 13 may use positions of furniture and a device such as a desk and a keyboard of a computer at the same time. According to this case, for example, when a hand of a human body is located in the neighbor of a keyboard, it can be judged that a person operates a computer with his/her hands.

Also, in the aforementioned description, an example is described in which the action recognition apparatus recognizes attitude of human being and outputs identification information of action associated with the recognition result. However, the invention is not limited thereto. That is, the invention can be applied to any case so long as a plurality of parts, which have similar colors and do correlated action with each other, are provided and at least one of the parts can be recognized by a method not using colors. Furthermore, not only colors but also general attribute information concerning appearance (such as colors or patterns) may be used. Specifically, the invention can specify attitude of an animal (can use colors or patches peculiar to individuals), and can specify attitude and action of a robot and a vehicle, which are not creatures.

The entire disclosure of Japanese Patent Application No. 2003-306206 filed on Aug. 29, 2003 including the specification, claims, drawings, and abstract is incorporated by reference in its entirety.

What is claimed is:

1. An action recognition method using a computer for acquiring image data generated by capturing an image including a face of a human and outputting action information representing an action content of the human captured in the image data, the action recognition method comprising:

specifying a first image region including a face portion of the human from the image data;

acquiring skin-color information peculiar to the human from pixel values of the first image region;

specifying at least one second image region including a predetermined portion of a body of the human from the image data except for the first image region based on the skin-color information, wherein the specifying the at least one second image region comprises obtaining a center of gravity of the skin-color information; and outputting the action information representing the action content of the human based on position relation between the specified first image region and the specified second image region, wherein the specifying the at least one second image region further comprises moving a search region until a distance between a newly obtained center of gravity and a previously obtained center of gravity of the search region is equal to or lower than a predetermined value.

2. An action recognition apparatus that acquires image data generated by capturing an image including a face of a human and outputs action information representing an action content of the human captured in the image data, the action recognition apparatus comprising:

a face-portion specifying device that specifies a first image region including a face portion of the human from the image data;

an acquisition device that acquires skin-color information peculiar to the human from pixel values of the first image region;

a specifying device that specifies at least one second image region including a predetermined portion of a body of the human from the image data except for the first image region based on the skin-color information, wherein the specifying device specifies the at least one second image region by obtaining a center of gravity of the skin-color information; and an information output device that outputs the action information representing the action content of the human based on position relation between the specified first image region and the specified second image region, wherein the specifying section specifies the at least one second image region by moving a search region until a distance between a newly obtained center of gravity and a previously obtained center of gravity of the search region is equal to or lower than a predetermined value.

3. A computer readable storage medium storing an action recognition program that causes a computer to acquire image data generated by capturing an image including a face of a human and output action information representing an action content of the human captured in the image data, the action recognition program causing the computer to execute a process comprising:

specifying a first image region including a face portion of the human from the image data;

acquiring skin-color information peculiar to the human from pixel values of the first image region;

specifying at least one second image region including a predetermined portion of a body of the human from the image data except for the first image region based on the skin-color information, wherein the specifying the at least one second image region comprises obtaining a center of gravity of the skin-color information; and outputting the action information representing the action content of the human based on position relation between the specified first image region and the specified second image region, wherein the specifying the at least one second image region further comprises moving a search region until a distance between a newly obtained center of gravity and a previously obtained center of gravity of the search region is equal to or lower than a predetermined value.

* * * * *